United States Patent [19]
Jones et al.

[11] Patent Number: 5,919,403
[45] Date of Patent: Jul. 6, 1999

[54] POLYMERIC FLUORESCENCE QUENCHING COMPOUNDS AND THEIR USE

[75] Inventors: Allan Scott Jones, Church Hill; Jean Carroll Fleischer; Max Allen Weaver, both of Kingsport, all of Tenn.

[73] Assignee: Eastman Chemical Company, Kingsport, Tenn.

[21] Appl. No.: 08/578,873

[22] Filed: Dec. 22, 1995

[51] Int. Cl.$^6$ ............... F21V 9/00; C08G 63/02; C08G 63/00

[52] U.S. Cl. .......... 252/582; 252/589; 528/272; 528/294; 528/295; 528/293; 528/299; 528/308; 528/308.1; 528/220

[58] Field of Search ............... 252/582, 589; 528/294, 295, 299, 308, 308.1, 272, 293, 302, 305, 220

[56] References Cited

U.S. PATENT DOCUMENTS

| | | |
|---|---|---|
| 5,310,857 | 5/1994 | Jones et al. . |
| 5,310,859 | 5/1994 | Kishiro et al. ............ 528/308 |
| 5,352,761 | 10/1994 | Jones et al. ............ 528/298 |
| 5,391,330 | 2/1995 | Jones et al. ............ 264/21 |
| 5,391,549 | 2/1995 | Maruyama et al. ........ 514/214 |
| 5,391,701 | 2/1995 | Jones et al. ............ 528/298 |
| 5,391,702 | 2/1995 | Jones et al. ............ 528/298 |
| 5,391,862 | 2/1995 | Amateau et al. ......... 219/667 |
| 5,418,318 | 5/1995 | Jones et al. ............ 528/298 |
| 5,554,720 | 9/1996 | Weaver et al. .......... 528/295 |

OTHER PUBLICATIONS

Research Disclosure 369–036–A (Jan. 1995).
Shangxian et al., "Fluorescence Spectra of Poly (Ethylene 2,6–Naphthalene Dicarboxylate)", *Scientia Sinica*, XXIV, 5, (1981).
Ti, et al, Intermolecular Excimer Interaction in Poly(Polytetramethylene Ether Glycol Aryl Dicarboxylate); *Acta Chimica Sinica*, 42, 1, (1984).

*Primary Examiner*—Philip Tucker
*Attorney, Agent, or Firm*—Karen A. Harding; Harry J. Gwinnell

[57] ABSTRACT

This invention relates to homopolyester compositions having fluorescence quenchers polymerized therein ("poly quenchers"). Specifically the "poly quencher" polymeric compositions comprises repeating units from (a) a dicarboxylic acid component and (b) a diol component, wherein at least one of (a) and (b) is comprised of at least one fluorescence polyquencher capable of reducing fluorescence of a polymer below the fluorescence displayed when said polyquencher is not included.

19 Claims, No Drawings

POLYMERIC FLUORESCENCE QUENCHING COMPOUNDS AND THEIR USE

FIELD OF THE INVENTION

This invention relates to homopolyester compositions having fluorescence quenchers polymerized therein and herein termed "poly quenchers". These "poly quenchers" may be melt blended with fluorescent polyesters containing 2,6-naphthalenedicarboxylate moieties or PET homo or copolyesters to produce polyester compositions having reduced fluorescence.

PRIOR ART

Poly(ethylene 2,6-naphthalenedicarboxylate), referred to as PEN, is widely used as an extrusion and injection molding resin because of its good heat resistance, high glass transition temperature, and gas barrier properties. PEN is used in the fabrication of various articles for household or industrial use, including appliance parts, containers, and auto parts. One major drawback of PEN, however, is its inherent bluish fluorescence when exposed to ultraviolet light. Thus, objects prepared from PEN have a hazy bluish appearance. This phenomenon is especially of concern in the packaging of foods and beverages when the food or beverage inside the PEN container appears unnatural.

Fluorescence is a type of luminescence in which an atom or molecule emits radiation in passing from a higher to a lower electronic state. The term is restricted to phenomena in which the time interval between absorption and emission of energy is extremely short ($10^{-10}$ to $10^{-6}$ second). Fluorescence in a polymer or small molecule, occurs when a photon is emitted from an excited single state. Quenching of fluorescence eliminates or reduces the ability for photon emission by providing an alternative pathway for the excited state energy such as vibronic or heat loss, or intersystem crossing to the excited triplet state.

It is desirable to provide a convenient method for quenching the fluorescence of polyesters containing 2,6-naphthalenedicarboxylate moieties in general and PEN in particular. Also, it is desirable to provide improved polyester compositions containing 2,6-naphthalenedicarboxylate moieties or PET homo a copolyesters and having reduced fluorescence.

Methods to quench fluorescence in PEN have been disclosed by Chen Shangxian, et al. in an article entitled, "Fluorescence Spectra of Poly(Ethylene 2-6-Naphthalene Dicarboxylate)" which appeared in SCIENTIA SINICA, Vol. XXIV, No. 5, May 1981, and by CAO Ti, et al. in an article entitled, "Intermolecular Excimer Interaction in Poly (Polytetramethylene Ether Glycol Aryl Dicarboxylate)" which appeared in ACTA CHIMICA SINICA, Vol. 42, No. 1, 1984. Both of the references disclose the use of o-chlorophenol to quench PEN fluorescence in a chloroform solution. Dissolving PEN in a chloroform solution to disperse the fluorescence quencher therein, however, is not practical on an industrial scale because only very dilute PEN solutions can be prepared. In addition, the PEN must have a low molecular weight to dissolve in the chloroform solution.

U.S. Pat. No. 5,310,859 discloses poly(ethylene 2,6-naphthalenedicarboxylate) polymers containing 0.1 to 5 mole % of a copolymerizable aromatic ketone which have reduced fluorescence.

U.S. Pat. No. 5,352,761 discloses certain naphthalene derivatives which are useful in providing reduced fluorescence in polyesters such as PEN and are copolymerizable with polyesters.

U.S. Pat. No. 5,391,701 discloses the use of polyester copolymerizable halo-aromatic compounds copolymerized with PEN and having reduced fluorescence.

U.S. Pat. No. 5,391,702 and 5,391,330 disclose a process for preparing PEN or dimethyl 2,6-naphthalene dicarboxylate containing copolyesters.fluorescence quencher blends via melt blending which have reduced fluorescence.

U.S. Pat. No. 5,393,862 and 5,418,318 disclose the use of dimethyl 2,6-naphthalene dicarboxylate-containing copolyesters or copolyamides having a copolymerized aromatic ketone compound or a halo-aromatic compound, respectively. The resultant polyesters or polyamides display have reduced fluorescence.

None of the above patents teaches polyester/olyester blends with reduced fluorescence.

U.S. Ser. No. 08/360,549 (Eastman Chemical Company) discloses PEN and dimethyl 2,6-naphthalene dicarboxylate-containing polymer compositions copolymerized with aromatic thioether compounds with reduced fluorescence. High levels of the aromatic thioether compound may be copolymerized into PEN and then the fluorescence quencher-containing polymer may be blended with PEN to reach ultimate quench levels of 0.1 –5.0 mol %.

Research Disclosure RD 369,036-A (Jan 1995) discloses the use of various hydroxy benzophenones in quenching fluorescence in PEN by melt blending 0.5–5 wt % of the various small molecules with PEN.

None of these references disclose or allude to the "poly quencher" compositions of this invention.

SUMMARY OF THE INVENTION

This invention relates to "poly quencher" polymeric compositions comprising repeating units from
 (a) a dicarboxylic acid component and
 (b) a diol component, wherein at least one of (a) and (b) is comprised of at least one fluorescence polyquencher capable of reducing fluorescence of a polymer below the fluorescence displayed when said polyquencher is not included.

Preferably said polyquencher is selected from the classes of aromatic ketones, halogen containing aromatic compounds and aromatic thioether compounds.

The dicarboxylic acid component may be at least one aliphatic diacid, preferably having 4 to 12 carbons or aromatic diacids preferably having 8 to 14 carbons. Specific examples of suitable dicarboxylic acids include terephthalic acid, isophthalic acid, phthalic acid, cyclohexanediacetic acid, diphenyl-4,4-dicarboxylic acid, succinic acid, glutaric acid, adipic acid, fumaric acid, azelaic acid, sebacic acid, 1,4-cyclohexanedicarboxylic acid, resorcinoldiacetic acid, diglycolic acid, 4,4'-oxybis (benzoic) acid, biphenyldicarboxylic acid, 1,12-dodecanedicarboxylic acid, 4,4'-sulfonyldibenzoic acid, 4,4'methylenedibenzoic acid, trans-4,4'-stilbenedicarboxylic acid, isomers of naphthalenedicarboxylic acid and the like and mixtures thereof. Preferably the dicarboxylic acid component is selected from terephthalic acid, isophthalic acid, 1,4-cyclohexanedicarboxylic acid, 2,6-, 1,5-, and 2,7-naphthalenedicarboxylic acid and mixtures thereof.

The diol component is selected from aliphatic diols, preferably having 2 to 20 carbons and aromatic and cycloaliphatic diols, preferably having 6 to 20 carbons including ethylene glycol, diethylene glycol, triethylene glycol, 1,4-cyclohexanedimethanol, propane-1,3-diol, butane-1,4-diol, pentane-1,5-diol, hexane-1,6-diol, 2,2-dimethyl-1,3-propanediol, 1,10-decanediol, 2,2,4,4-tetramethyl-1,3-cyclobutanediol, 3-methylpentanediol-(2, 4), 2-methylpentanediol-(1,4), 2,2,4-trimethylpentane-diol-(1,3), 2-ethylhexanediol-(1,3), 2,2-diethylpropane-diol-(1, 3), hexanediol-(1,3), 1,4-di-(hydroxyethoxy)-benzene, 2,2-bis-(4-hydroxycyclohexyl)-propane, 2,4-dihydroxy-1,13,3-tetramethyl-cyclobutane, 2,2-bis-(3-hydroxyethoxyphenyl)- propane, 2,2-bis-(4-hydroxypropoxyphenyl)-propane and mixtures thereof. Preferably the diol is selected from ethylene glycol, 1,4-butanediol, 2,2-dimethyl-1,3-propanediol, 1,4-cyclohexanedimethanol and mixtures thereof.

The fluorescence quencher compound is more particularly described by Formula I:

I wherein FQ is a fluorescence quencher moiety selected from the classes of aromatic ketones, halogen containing aromatic compounds, aromatic thioether compounds and others that quench fluorescence in terephthalate or naphthalenedicarboxylate containing polymers; X is a polyester reactive group selected from carboxylic acid, hydroxy, or reactive equivalents such as carboxylic acid chlorides, carboxylic esters and the like. Suitable fluorescence quenching compounds include those disclosed in U.S. Pat. Nos. 5,310,859 and 5,391,549 and U.S. Ser. No. 08/360,549, all of which are incorporated herein by reference.

When dicarboxylic acid component (a) is a fluorescence quencher compound of Formula I, then diol component (b) may comprise from 0 to 100 mole % of a diol fluorescence quencher compound of Formula I, where X is hydroxy, and/or one more hydroxy derived from aliphatic diols, preferably having 2 to 20 carbons and aromatic and cycloaliphatic diols, preferably having 6 to 20 carbons including ethylene glycol, diethylene glycol, triethylene glycol, 1,4-cyclohexanedimethanol, propane-1,3-diol, butane-1,4-diol, pentane-1,5-diol, hexane-1,6-diol, 2,2-dimethyl-1,3-propanediol, 1,10-decanediol, 2,2,4,4-tetramethyl-1,3-cyclobutanediol, 3-methylpentanediol-(2, 4), 2-methylpentanediol-(1,4), 2,2,4-trimethylpentane-diol-(1,3), 2-ethylhexanediol-(1,3), 2,2-diethylpropane-diol-(1, 3), hexanediol-(1,3), 1,4-di-(hydroxyethoxy)-benzene, 2,2-bis-(4-hydroxycyclohexyl)-propane, 2,4-dihydroxy-1,13,3-tetramethyl-cyclobutane, 2,2-bis-(3-hydroxyethoxyphenyl)-propane, 2,2-bis-(4-hydroxypropoxyphenyl)-propane and mixtures thereof. Preferably at least one hydroxy is derived from ethylene glycol, 1,4-butanediol, 2,2-dimethyl-1,3-propanediol, 1,4-cyclohexanedimethanol and mixtures thereof.

When the diol component (a) is a fluorescence quenching compound then the diacid component may comprise from 0 to 100 mole % of a diacid fluorescence quencher compound of Formula I, where X is the same or different and selected from a carboxy or a reactive equivalent thereof, and/or a carboxy derivative of one 30 or more of the following aliphatic diacids, preferably having 4 to 12 carbons or aromatic diacids preferably having 8 to 14 carbons: .terephthalic acid, isophthalic acid, phthalic acid, cyclohexanediacetic acid, diphenyl-4,4-dicarboxylic acid, succinic acid, glutaric acid, adipic acid, fumaric acid, azelaic acid, sebacic-acid, 1,4-cyclohexanedicarboxylic acid, resorcinoldiacetic acid, diglycolic acid, 4,4'-oxybis (benzoic) acid, biphenyl-dicarboxylic acid, 1,12-dodecanedicarboxylic acid, 4,4'-sulfonyldibenzoic acid, 4,4'-methylenedibenzoic acid, trans-4,4'-stilbenedicarboxylic acid, isomers of naphthalenedicarboxylic acid and the like and mixtures thereof. Preferably the carboxy is derived from terephthalic acid, isophthalic acid, 1,4-cyclohexanedicarboxylic acid, 2,6-, 1,5-, and 2,7-naphthalenedicarboxylic acid and mixtures thereof.

It is understood that the corresponding acid anhydride, acid chlorides, and esters of these acids are included in the term "dicarboxylic acid". The polyester may be prepared from one or more of the above diacids and diols.

When the copolymerizable fluorescent quencher of Formula I is an aromatic ketone, the aromatic portion is selected from benzene, naphthalene and biphenyl moieties and these substituted with one or more groups selected from halogen, $C_1$ to $C_6$-alkyl or $C_1$ to $C_6$-alkoxy. In addition to the polyester reactive groups, the aromatic ring contains at least one acyl group which has the structure:

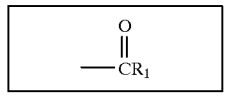

wherein $R_1$ is selected from $C_1$ to $C_{10}$-alkyl, phenyl, substituted phenyl, naphthyl, substituted naphthyl. Examples of acyl groups include acetyl, propionyl, butyryl, isobutyryl, benzoyl, 4-methylbenzoyl, 3-methylbenzoyl, 2-methylbenzoyl, 4-ethoxybenzoyl, 3-methoxybenzoyl, 4-hydroxybenzoyl, 4-bromobenzoyl, 2-chlorobenzoyl, 3-iodobenzoyl, 4-n-butylbenzoyl, 4-phenylbenzoyl, 4-phenoxybenzoyl, 4-methylthiobenzoyl, 4-phenylthiobenzoyl, 1-naphthoyl, and 2-naphthoyl. The most preferred acyl group is benzoyl. The acyl groups may be attached to any of the unsubstituted positions on the aromatic ring(s). Preferred copolymerizable aromatic ketones include dimethyl benzoylterephthalate, benzoylterephthalic acid, dimethyl 1-benzoyl-2,6-naphthalenedicarboxylate, 1-benzoyl-2,6-naphthalenedicarboxylic acid, dimethyl 3-benzoyl-2,6-naphthalenedicarboxylate, dimethyl 4-benzoyl-2,6-naphthalenedicarboxylate, dimethyl 1-(2-naphthoyl)-2,6-naphthalenedicarboxylate, dimethyl 5-benzoylisophthalate, dimethyl 2-benzoyl-6-bromoterephthalate, dimethyl 2-benzoyl-5-iodoterephthalate, dimethyl 2-benzoyl-6-iodoterephthalate, dimethyl 2-benzoyl-5-bromoterephthalate and the like.

The copolymerizable halogenated aromatic fluorescence quenchers of Structure I contain an aromatic portion selected from benzene, naphthalene, and biphenyl moieties and these substituted with one or more groups selected from $C_1$ to $C_6$-alkyl and $C_1$ to $C_6$-alkoxy. In addition to the polyester reactive groups (X), the aromatic ring(s) contains one or more halogen atoms selected from fluorine, chlorine, bromine, and iodine. If the moeity providing the quenching effect is halogen then bromine and/or iodine must be present and additional halogens are optional. However, if another quenching moeity is present any of the listed halogens may be included. Bromine and iodine are the preferred halogens. Exemplary copolymerizable halogen containing aromatic fluorescence quenchers include dimethyl iodoterephthalate, iodoterephthalic acid, dimethyl 4-bromo-2,6-naphthalenedicarboxylate, 4-bromo-2,6-naphthalenedicarboxylic acid, dimethyl 1-bromo-2,6-naphthalenedicarboxylate, dimethyl 3-bromo-2,6-naphthalenedicarboxylate, dimethyl 1-iodo-2,6-naphthalenedicarboxylate, dimethyl 3-iodo-2,6-naphthalenedicarboxylate, 3-iodo-2,6-naphthalenedicarboxylic acid, dimethyl 4-iodo-2,6-naphthalenedicarboxylate, dimethyl 2-bromo-5-iodoterephthalate, dimethyl 2-bromo-6-iodoterephthalate and the like.

The copolymerizable fluorescent quencher compounds of Formula I wherein FQ is an aromatic thioether moiety. are more adequately described by the general structure:

wherein n is 2 or more, preferably 2; $R_2$ is selected from $C_1$ to $C_{12}$-alkyl, $C_5$ to $C_7$-cycloalkyl, $C_3$ to $C_8$-alkenyl, $C_3$ to $C_8$-alkynyl, phenyl, substituted phenyl, or -L-X, wherein L is an organic divalent linking group and X is a polyester reactive group; with the provision that two -L-X groups must be present; Ar is an aromatic radical selected from benzene, naphthalene, biphenyl, and

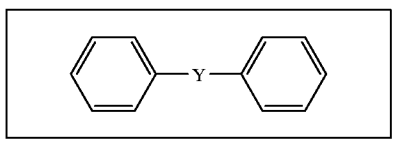

and these aromatics substituted with one or more groups selected from halogen, $C_1$ to $C_6$-alkyl as $C_1$ to $C_6$-alkoxy; Y is selected from

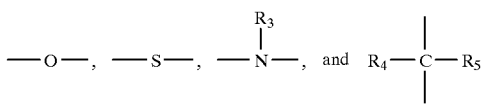

wherein $R_3$ is selected from hydrogen, $C_1$ to $C_6$-alkyl, $C_5$ to $C_7$-cycloalkyl, phenyl, substituted phenyl and -L-X; $R_4$ and $R_5$ are independently selected from $C_1$ to $C_6$-alkyl, phenyl, and substituted phenyl.

In the above definition of the fluorescent quenchers of Formula I, the terms "$C_1$ to $C_6$-alkyl" and "$C_1$ to $C_{12}$-alkyl" are used to designate straight or branched chained hydrocarbon radicals containing up to 6 and up to 12 carbons, respectively, and these substituted with one or more groups selected from $C_1$ to $C_6$-alkoxy, $C_5$ to $C_7$-cycloalkyl, halogen, hydroxy, acetoxy, cyano, phenyl, and substituted phenyl.

In the term "$C_1$ to $C_6$-alkoxy" the alkyl radical is a straight or branched chain alkyl group containing up to 6 carbon atoms optionally substituted with one or more groups listed above as possible substituents on the $C_1$ to $C_6$-alkyl groups.

The terms "$C_3$ to $C_8$-alkenyl" and "$C_3$ to $C_8$-alkynyl" are used to denote aliphatic hydrocarbon moieties having 3 to 8 carbon atoms and at least one carbon-carbon double bond or carbon-carbon triple bond, respectively.

The term "halogen" is used to indicate fluorine, chlorine, bromine, and iodine, unless otherwise indicated.

The term "$C_5$ to $C_7$-cycloalkyl" is used to describe a cycloaliphatic radical containing 5 to 7 ring carbon atoms and which may be further substituted with one or more $C_1$ to $C_6$-alkyl groups.

The terms "substituted phenyl" and "substituted naphthyl" are used to describe phenyl and naphthyl radicals, respectively, containing one or more substituents selected from $C_1$ to $C_6$-alkyl, $C_1$ to $C_6$-alkoxy, halogen, and hydroxy.

In the definition of L, the term "organic divalent linking group" includes $C_1$ to $C_{12}$-alkylene, $C_1$ to $C_4$-alkylene-cyclohexylene-$C_1$ to $C_4$-alkylene; arylene, $C_1$ to $C_4$-alkylene arylene, $C_1$ to $C_4$-alkylene-S-arylene, $C_1$ to $C_4$-alkylene-O-arylene, $C_1$ to $C_4$-alkylene-arylene-$C_1$ to $C_4$-alkylene, $C_1$ to $C_4$-alkylene-S-$C_1$-$C_4$-alkylene, $C_1$ to $C_4$-alkylene-O-arylene-O-$C_1$ to $C_4$ alkylene, $C_1$ to $C_4$alkylene-Y-$C_1$ to $C_4$-alkylene or $-(CH_2CH_2O\ )m_1CH_2CH_2-$, wherein "arylene" is used to denote 1,2-, 1,3-, and 1,4-phenylene and those radicals substituted with one or more groups selected from $C_1$ to $C_6$-alkyl, $C_1$ to $C_6$-alkoxy, carboxy, $C_1$ to $C_6$-alkoxycarbonyl; the term "cyclohexylene" is used to denote 1,2-, 1,3-, and 1,4-cyclohexylene radicals; the terms "$C_1$ to $C_4$-alkylene" and "$C_1$ to $C_{12}$-alkylene" are used to denote straight or branched divalent aliphatic hydrocarbon radicals containing up to 4 and up to 12 carbon atoms, respectively, and those substituted with one or more groups selected from hydroxy, $C_1$ to $C_6$-alkanoyloxy, carboxy, $C_1$ to $C_6$-alkoxycarbonyl, $C_1$ to $C_6$-alkoxy, phenyl, substituted phenyl and halogen; Y is as previously defined; ml is 1 to 10; the alkyl portion of the "$C_1$ to $C_6$-alkoxycarbonyl" and "$C_1$ to $C_6$-alkanoyloxy" radicals contain 1 to 6 carbon atoms.

Preferably L is $C_1$ to $C_6$-alkylene (most preferably ethylene), $C_1$ to $C_6$-alkylene-arylene (most preferably $CH_2$-1,2-, 1,3-, and 1,4-phenylene) or arylene (most preferably 1,2-, 1,3-, and 1,4-phenylene).

In the further practice of the invention the polyester "poly quenchers" described above are melt blended with a fluorescent polyester composition containing 2,6-naphthalenedicarboxylate moieties or PET homo and/or copolyesters comprising repeat units from:

(a') dicarboxylic acid component which comprises repeat units from terephthalic acid or dimethyl terephthate and/or 2,6-naphthalenedicarboxylic acid or 2,6-naphthalenedicarboxylic esters, (b') a diol component.

Preferably, the polymeric composition is poly(ethylene 2,6-naphthalenedicarboxylate) (PEN) or PEN copolymer from a diacid component comprising at least 5.0 mole % of 2,6-naphthalenedicarboxylic acid or ester and a diol component comprising at least 85 mole % of ethylene glycol.

The dicarboxylic component (a') which does not comprise 2,6-naphthalenedicarboxylic acid or ester may be selected from one or more of the dicarboxylic components listed for (a) above. The diol component (b') may be selected from one or more of the diol components listed for (b) above.

Again, it is understood that the corresponding acid anhydrides, acid chlorides and esters of these acids are included in the term "dicarboxylic acid".

It is within the scope of the invention to replace in the blend described above at least a portion of the fluorescent polymer described above containing the 2,6-naphthalenedicarboxylate moiety with other commonly available polyesters including poly(alkylene terephthalate) homo and copolyesters, poly(1,4-cyclohexylenedimethylene terephthalate) homo and copolyesters and polycarbonate homo and copolymers.

It would also be possible to melt blend the "poly quencher" with one or more of the commonly available polymers described above to produce a "concentrate" which would then be further blended with the fluorescent polymer containing the 2,6-naphthalenedicarboxylate moieties, producing a final composition which has. reduced fluorescence.

The total amount of the "poly quencher" in the blends described above may vary considerably, but normally is from about 0.1 to 10 weight %, preferably 0.5 to 5.0 weight %, based on the total weight of the blend. It is understood that more than one "poly quencher" may be added to the blend, if desired, within the scope of the invention.

The commonly available polyesters which are blended with the fluorescent 2,6-naphthalenedicarboxylate containing polyester and the "poly quencher" are generally based on terephthalic acid and one or more glycols containing 2 to about 12 carbon atoms. Preferred glycols include ethylene glycol, 1,4butanediol, 1,6-hexanediol, 1,4-cyclohexanedimethanol, and 2,2-dimethyl-1,3-propanediol. Homo and copolyesters may be used. The copolyesters may contain up to about 50 mole % of modifying dibasic acids and/or glycols. Typical modifying dibasic acids include isophthalic, 1,4-cyclohexanedicarboxylic, adipic, glutaric, azelaic, sebacic and the like while modifying glycols will include those of 2 to about 12 carbon atoms and may be aliphatic or alicyclic in nature. Useful polyesters include poly(ethylene terephthalate) (PET), PET copolyester containing 5 mole % isophthalic acid, PET copolyester containing 31 mole % 1,4-cyclohexanedimethanol, PET copolyester containing 37 mole % diethylene glycol, PET copolyester containing 50 mole % 1,4-butanediol, poly(1,4-butyleneterephthalate) (PBT), PBT copolyester containing 15 mole % ethylene glycol, poly(ethylene 1,4-cyclohexanedicarboxylate), poly(1,4-cyclohexylenedimethylene terephthalate) (PCT), PCT copolyester containing 18 mole % ethylene glycol and the like. All of these polyesters are readily prepared by methods well known to those skilled in the art.

The polycarbonate polymers are well-known molding plastics. They are generally derived from phosgene and dihydroxy aromatic compounds such as 4,4'-isopropylidenediphenol (Bisphenol A). Certain polycarbonate copolyesters such as those modified with aromatic dibasic acids (e.g., terephthalic acid) are also well known. The inherent viscosity (I.V.) values of useful polycarbonate will generally be in the range of about 0.2 to about 1.2 dL/g.

The blends of this invention are readily prepared in conventional melt processing equipment such as Brabender Plastograph equipment, single-screw extruders, twin-screw extruders and the like. The blends are generally processed at temperatures in the range of about 260° C. to about 330° C. Properties of the blends may be altered significantly depending on the mixing temperature and mixing time. For example, longer processing times lead to a greater degree of transesterification between the PEN polymer and the additional polyester components. Generally, processing times in the range of about 0.4 to about 5 minutes are useful to achieve the desired results.

Many other ingredients can be added to the compositions of the present invention to enhance the performance properties of the polyester. For example, surface lubricants, denesting agents, stabilizers, antioxidants, ultraviolet light absorbing agents, mold release agents, metal deactivators, colorants such as black iron oxide and carbon black, nucleating agents, phosphate stabilizers, zeolites, fillers, and the like, can be included herein. All of these additives and the use thereof are well known in the art. Any of these compounds can be used so long as they do not hinder the present invention form accomplishing its objects.

The poly(ethylene 2,6-naphthalenedicarboxylate) polymer (PEN), PET and copolymers of either or both are prepared by conventional polycondensation procedures well known in the art which generally include-a combination of melt phase and solid state polymerization. Melt phase describes the molten state of PEN/PET during the initial polymerization process. The initial polymerization process includes direct condensation of the acid (naphthalene-2,6-dicarboxylic acid or terephthalic acid) with ethylene glycol or by ester interchange using the ester (naphthalene-2,6-naphthalenedicarboxylate or dimethylterephthalate) is and ethylene glycol at elevated temperatures in the presence of suitable catalysts. The melt phase is concluded by extruding the PEN polymer into strands and pelletizing.

The PEN and/or PET homopolymers and copolymers may optionally be solid state polymerized. Solid state polymerization involves heating the polyester pellets to a temperature in excess of 200° C., but well below the crystalline melt point, either in the presence of an inert gas stream or in a vacuum to remove a diol. Several hours are generally required in the solid state polymerized unit to build the molecular weight.

Typical catalysts which may be used include titanium alkoxides, dibutyl in dilaurate, combinations of zinc, manganese, or magnesium acetates or benzoates with antimony oxide or antimony triacetate.

The inherent viscosity of the polyesters should be 0.3 to 1.5 dL/g. However, inherent viscosities from 0.5 to 0.9 are preferred, as measured at 25° C. using 0.50 grams of polymer per 100 mL of solvent consisting of 60% by weight phenol and 40% by weight tetrachloroethane.

The polyesters serve as excellent starting materials for the production of moldings of all types. Specific applications include food packaging such as bottles, trays, lids and films, medical parts, appliance parts, automotive parts, tool housings, and recreational and utility parts. The molding compositions of the present invention are especially useful in applications that require transparent molded parts. Additionally, the polyesters can be used to prepare extruded sheets for thermoforming applications. The polyesters are readily extruded into films or processed into monolayer or multilayer food and beverage containers. Potential methods for producing containers include: (1) injection stretch blow molding using either one or two stage technology, (2) injection blow molding, (3) extrusion blow molding, (4) pipe extrusion, and (5) co-injection or co-extrusion where the polyesters can serve as either the structural layer or barrier layer depending upon end use requirements. Fibers, melt blown webs, extruded sheets, vacuum drawn trays.parts, injection molded parts, and extrusion coated wires may also be made from. these polyesters.

The materials and testing procedures used for the results shown herein are as follows:

Fluorescence Intensity was determined using a Perkin Elmer LS5B Luminescence Spectrometer which measures relative fluorescence intensity.

The composition of the polyesters was determined using $^1$HNMR spectroscopy.

Glass transition temperature (Tg) and melting temperature (Tm) were determined by differential scanning calorimetry (DSC) using a Perkin Elmer DSC II instrument. The Tg and Tm were determined using a 20° C./minute scan rate after the samples have been heated above the Tm and quenched below the Tg.

Inherent viscosity (I.V.) was measured at 25° C. using 0.50 grams of polymer per 100 mL of a solvent consisting of 60% by weight phenol and 40% by weight tetrachlorethane.

Sample preparation for determining fluorescence intensity involved micropulverizing the extruded and crystallized pellets in an analytical grinding mill and passing through a 120 mesh screen. Approximately 0.5 grams of the powder were packed into a sample holder and measurements were taken by reflectance. The excitation wavelength was 350 nm. Fluorescence results are listed in Table I.

The present invention will be further illustrated by a consideration of the following examples, which are intended to be exemplary of the invention. All parts and percentages in the examples are on a weight basis unless otherwise stated.

EXAMPLES

Example 1

Preparation of Poly(ethylene 1-benzoyl-2,6-naphthalenedicarboxylate) (BnzN/EG)

Dimethyl 1-benzoyl-2,6-naphthalene dicarboxylate (0.10 moles, 34.8 grams) and ethylene glycol (0.20 moles, 12.4) and catalyst metals [55 ppm Mn from Mn (OAc)$_2$ and 200 ppm Sb from Sb (OAC)$_3$] were placed in a 0.5 liter polymerization reactor under a nitrogen atmosphere. The mixture was heated with stirring at 200° C. for 2 hours. The temperature was increased to 220° C. and maintained for 1 hour. The temperature was increased to 285° C. which took approximately 20 minutes. Phosphorous (60 ppm) was added in the form of a phosphate ester. When the temperature reached 285° C., the nitrogen flow was stopped and vacuum was applied. The polymer was stirred under vacuum (0.1–0.3 mm Hg) for about 45 minutes. The polymer was cooled and ground to 3–4 mm in size. The Ih.V. was 0.167 dL/g. The Tg was 135.4° C. No melting point was observed.

Example 2

Melt Blend of BnzN/EG and PEN

EASTMAN® PEN Homopolymer 14991 pellets (Ih.V.= 0.56 dL/g) were dried overnight at 140° C. in a forced air drying unit. BnzN/EG ground sample (3–4 mm) was dried for 17 hours at 70° C. in a vacuum oven (10–20 Torr) with a nitrogen sweep. The two polymers were pellet/pellet blended in a plastic bag (8 grams BnzN/EG, 292 grams PEN) and added to a 19 mm Brabender single-screw extruder with an L/D ratio of 25/1. The extruder was equipped with a mixing screw with a 3:1 compression ratio and six rows of staggered pins near the nozzle. A screw speed of 90 rev/min. was used. The average residence time in the extruder was 1.5 minutes. All zones were set at 300° C. The actual melt temperature was 305–310° C. The extruded rod was quenched in water and chopped. The pellets were then crystallized for 3 hours at 160° C. in a forced air drying unit and dried for another 24 hours at 100° C. The Ih.V. of the blend was 0.480 dL/g. The Tg was 122.7° C. and the Tm was 264.7° C.

The crystallized and dried pellets were again blended and extruded as described above twice more (second and third extruder passes). The pellets were crystallized and dried for 8 and 4 hours at 160° C. in a forced air drying unit after the second and third pass, respectively. The Ih.V. of the final blend was 0.456 dL/g. The Tg was 122.7° C. and the Tm was 265.0° C. The fluorescence data for the first and third extruder passes is listed in Table 1, below.

Example 3

Melt Blend of BnzN/EG and PET

EASTMAN PET 12440 pellets (Ih.V.=0.72 dL/g) were dried overnight at 140° C. in a forced air drying unit. BnzN/EG ground sample (3–4 mm) was dried for 17 hours at 70° C. in a vacuum oven (10–20 Torr) with a nitrogen sweep. The two polymers were pellet/pellet blended in a plastic bag (10 grams BnzN/EG, 290 grams PET), added to a 19 mm Brabender single-screw extruder, melt blended and extruded as described in Example 2. The pellets were then crystallized for 3 hours at 160° C. in a forced air drying unit and dried for another 24 hours at 100° C. The properties after the first pass were Ih.V.=0.605 dL/g, Tg=79.7° C. and Tm=249.5 ° C. The pellets were subjected to a second and third extruder pass as described in Example 2. The properties of the final blend were: Ih.V.=0.586 dL/g, Tg=79.6° C. and Tm=250.6° C. The fluorescence data for passes one and three are summarized in Table 1.

Example 4

Extrusion of PEN as a control

EASTMAN® PEN Homopolymer 14991 pellets (Ih.V.= 0.56 dL/g) were dried overnight in a forced air drying unit and then added to a 19 mm Brabender single-screw extruder and extruded as described in Example 2. The pellets were then crystallized for 1 hour at 190° C. in a forced air drying unit and dried for another 24 hours at 100° C. The properties after the first pass were Ih.V. of 0.503 dL/g, Tg was 123.0° C. and Tm was 266.5 ° C.

The pellets were subjected to a second and third extruder pass as described in Example 2. The properties of the final blend were: Ih.V. was 0.491 dL/g, Tg was 121.8° C. and Tm was 265.1° C. The fluorescence data for first and third passes are summarized in Table 1.

Example 5

Extrusion of PET sample as a control

EASTMAN® PET 12440 pellets (Ih.V.=0.72 dL/g) were dried overnight in a forced air drying unit, added to a 19 mm Brabender single-screw extruder and extruded as described in Example 2. The pellets were then crystallized for 3 hours at 160° C. in a forced air drying unit and dried for another 24 hours at 100° C. The Ih.V. of the polymer was 0.643 dL/g. The Tg was 77.1° C. and the Tm was 252.0° C.

The pellets were subjected to a second and third extruder pass as described in Example 2. The properties of the final blend were: Ih.V. was 0.617 dL/g, Tg was 77.8° C. and the Tm was 252.3 ° C. The fluorescence data for passes one and three are summarized in Table 1.

TABLE 1

Fluorescence Intensity of PEN/PET Blends With and Without Fluorescence Quencher

| | | | | | | | Pass 1 | | Pass 3 | |
| --- | --- | --- | --- | --- | --- | --- | --- | --- | --- | --- |
| Example* | Polymers | Amount Grams | Quencher | Amount Grams | PEN wt % | Quencher wt % | Max Wavelength (nm) | Fluorescence Intensity | Max Wavelength (nm) | Fluorescence Intensity |
| 5 | PET | 300 | — | — | 0 | 0 | 385 | 259 | 380 | 574 |
| 3 | PET | 290 | BnzN/EG | 10 | 0 | 3.3 | 410 | 14 | 417 | 27 |
| 4 | PEN | 300 | — | 0 | 100 | 0 | 426 | 1065 | 426 | 1164 |
| 2 | PEN | 292 | BnzN/EG | 8 | 97.3 | 2.7 | 428 | 664 | 429 | 738 |

*First # listed is pass 1 through extruder.
Second is Pass 3.

The examples in Table 1 clearly show that the fluorescence intensity of PEN or PET is significantly reduced by the addition of a "polyquencher" in small amounts (ie less than about 3 weight %).

We claim:

1. Poly quencher polymeric compositions consisting essentially of poly repeating units derived from
   (a) a dicarboxylic acid component and
   (b) a diol component, wherein at least one of (a) and (b) is comprised of at least one fluorescence polyquencher selected from the group consisting of aromatic ketones, halogen containing aromatic compounds and aromatic thioether compounds capable of reducing fluorescence of a polymer below the fluorescence displayed when said polyquencher is not included.

2. The composition of claim 1 wherein said dicarboxylic acid component is selected from the group consisting of aliphatic diacids having 4 to 12 carbons, aromatic diacids having 8 to 14 carbons and mixtures thereof.

3. The composition of claim 2 wherein said dicarboxylic acid component is selected from the group consisting of terephthalic acid, isophthalic acid, phthalic acid, cyclohexanediacetic acid, diphenyl-4,4-dicarboxylic acid, succinic acid, glutaric acid, adipic acid, fumaric acid, azelaic acid, sebacic acid, 1,4-cyclohexanedicarboxylic acid, resorcinoldiacetic acid, diglycolic acid, 4,4'-oxybis (benzoic) acid, biphenyldicarboxylic acid, 1,12-dodecanedicarboxylic acid, 4,4'-sulfonyldibenzoic acid, 4,4'-methylenedibenzoic acid, trans-4,4'-stilbenedicarboxylic acid, naphthalenedicarboxylic acid and mixtures thereof.

4. The composition of claim 2 wherein said dicarboxylic acid component is selected from the group consisting of terephthalic acid, isophthalic acid, 1,4-cyclohexanedicarboxylic acid, 2,6-, 1,5-and 2,7-naphthalenedicarboxylic acid and mixtures thereof.

5. The composition of claim 1 wherein said diol component is selected from the group consisting of aliphatic diols having 2 to 20 carbons, aromatic and cycloaliphatic diols having 6 to 20 carbons and mixtures thereof.

6. The composition of claim 5 wherein said diol component is selected from the group consisting of ethylene glycol, diethylene glycol, triethylene glycol, 1,4-cyclohexanedimethanol, propane-1,3-diol, butane-1,4-diol, pentane-1,5-diol, hexane-1,6-diol, 2,2-dimethyl-1,3-propanediol, 1,10-decanediol, 2,2,4,4-tetramethyl-1,3-cyclobutanediol, 3-methylpentanediol-(2,4), 2-methylpentanediol-(1,4), 2,2,4-trimethylpentane-diol-(1,3), 2-ethylhexanediol-(1,3), 2,2-diethylpropane-diol-(1,3), hexanediol-(1,3), 1,4-di-(hydroxyethoxy)-benzene, 2,2-bis-(4-hydroxycyclohexyl)-propane, 2,4-dihydroxy-1,13,3-tetramethyl-cyclobutane, 2,2-bis-(3-hydroxyethoxyphenyl)-propane, 2,2-bis-(4-hydroxypropoxyphenyl)-propane and mixtures thereof.

7. The composition of claim 5 wherein said diol component is selected from the group consisting of ethylene glycol, 1,4-butanediol, 2,2-dimethyl-1,3-propanediol, 1,4-cyclohexanedimethanol and mixtures thereof.

8. The composition of claim 1 wherein said dicarboxylic acid component is a fluorescence quencher compound of Formula I:

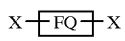

wherein X is a polyester reactive group selected from carboxylic acid, carboxylic acid chlorides and carboxylic esters when Formula I is said dicarboxylic acid component and the diol component comprises from 0 to 100 mole % of a diol fluorescence quencher compound of Formula I, where when Formula I is said diol fluorescence quencher compound X is hydroxy, and/or one or more hydroxy derived from aliphatic diols, preferably having 2 to 20 carbons and aromatic and cycloaliphatic diols, preferably having 6 to 20 carbons including ethylene glycol, diethylene glycol, triethylene glycol, 1,4-cyclohexanedimethanol, propane-1,3-diol, butane-1,4-diol, pentane-1,5-diol, hexane-1, 6-diol, 2,2-dimethyl-1,3-propanediol, 1,10-decanediol, 2,2,4,4-tetramethyl-1,3-cyclobutanediol, 3-methylpentanediol-(2,4), 2-methylpentanediol-(1,4), 2,2,4-trimethylpentane-diol-(1,3), 2-ethylhexanediol-(1,3), 2,2-diethylpropane-diol-(1,3), hexanediol-(1,3), 1,4-di-(hydroxyethoxy)-benzene, 2,2-bis-(4-hydroxycyclohexyl)-propane, 2,4-dihydroxy-1,13,3-tetramethyl-cyclobutane, 2,2-bis-(3-hydroxyethoxyphenyl)-propane, 2,2-bis-(4-hydroxypropoxyphenyl)-propane and mixtures thereof wherein FO is the same or different and is a fluorescence quencher moiety capable of quenching fluorescence in terephthalate or naphthalenedicarboxylate containing polymers.

9. The composition of claim 8 wherein said at least one hydroxy is derived from ethylene glycol, 1,4-butanediol, 2,2-dimethyl-1,3-propanediol, 1,4-cyclohexanedimethanol and mixtures thereof.

10. The composition of claim 1 wherein said diol component is a fluorescence quencher compound of Formula I

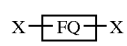

wherein X is selected from hydroxy polyester reactive groups when Formula I is said diol component and said dicarboxylic acid component further comprises from 0 to 100 mole % of a diacid fluorescence quencher compound of Formula I wherein X is the same or different and selected from the group consisting of a carboxy, a reactive equivalent thereof when Formula I is said diacid fluorescence quencher and wherein FO is the same or different and is a fluorescence quencher moiety capable of quenching fluorescence in terephthalate or naphthalenedicarboxylate containing polymers.

11. The composition of claim 10 wherein said carboxy is derived from a dicarboxylic acid selected from the group consisting of terephthalic acid, isophthalic acid, phthalic acid, cyclohexanediacetic acid, diphenyl-4,4-dicarboxylic acid, succinic acid, glutaric acid, adipic acid, fumaric acid, azelaic acid, sebacic acid, 1,4-cyclohexanedicarboxylic acid, resorcinoldiacetic acid, diglycolic acid, 4,4'-oxybis (benzoic) acid, biphenyldicarboxylic acid, 1,12-dodecanedicarboxylic acid, 4,4'-sulfonyldibenzoic acid, 4,4'-methylenedibenzoic acid, trans-4,4'-stilbenedicarboxylic acid, naphthalenedicarboxylic acid and mixtures thereof.

12. The composition of claim 10 wherein said carboxy is derived from a dicarboxylic acid selected from the group consisting of terephthalic acid, isophthalic acid, 1,4-cyclohexanedicarboxylic acid, 2,6-, 2,7-, 1,5- naphthalene-dicarboxylic acid and mixtures thereof.

13. The composition of claim 1 wherein said fluorescence quencher compound is a compound of Formula I:

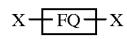

wherein FQ is a fluorescence quencher moiety selected from the group consisting of aromatic ketones, halogen containing aromatic compounds and aromatic thioether compounds; X is a polyester reactive group selected from carboxylic acid, hydroxy, and reactive equivalents such as carboxylic acid chlorides, carboxylic esters and mixtures thereof.

14. The composition of claim 13 wherein said fluorescent quencher is an aromatic ketone having an aromatic portion which is selected from the group consisting of benzene, naphthalene and biphenyl moieties substituted with one or more groups selected from the group consisting of halogen, $C_1$–$C_6$ alkyl or $C_1$–$C_6$ alkoxy.

15. The composition of claim 13 wherein said aromatic ketones, halogen containing aromatic compounds and aromatic thioether compounds comprise an aromatic ring having at least one acyl group which has the structure:

wherein $R_1$ is selected from $C_1$ to $C_{10}$-alkyl, phenyl, substituted phenyl, naphthyl, substituted naphthyl.

16. The composition of claim 15 wherein said acyl groups are selected from the group consisting of acetyl, propionyl, butyryl, isobutyryl, benzoyl, 4-methylbenzoyl, 3-methylbenzoyl, 2-methylbenzoyl, 4-ethoxybenzoyl, 3-methoxybenzoyl, 4-hydroxybenzoyl, 4-bromobenzoyl, 2-chlorobenzoyl, 3-iodobenzoyl, 4-n-butylbenzoyl, 4-phenylbenzoyl, 4-phenoxybenzoyl, 4-methylthiobenzoyl, 4-phenylthiobenzoyl, 1-naphthoyl, 2-naphthoyl and mixtures thereof.

17. A process comprising melt blending at least one poly quencher recited in claim 1 with a polyester comprising repeat units from:

(a') dicarboxylic acid component which comprises repeat units from terephthalic acid or dimethyl terephthate and/or 2,6-naphthalenedicarboxylic acid or 2,6-naphthalenedicarboxylic esters, (b') a diol component, preferably, the polymeric composition is poly(ethylene 2,6-naphthalenedicarboxylate) (PEN) or PEN copolymer from a diacid component comprising at least 5.0 mole % of 2,6-naphthalenedicarboxylic acid or ester and a diol component comprising at least 85 mole % of ethylene glycol.

18. The process of claim 17 wherein said polyester comprises 2,6-naphthalenedicarboxylate moieties.

19. The process of claim 18 wherein said polyester further comprises PET homopolymer and/or copolyesters.

* * * * *